Oct. 20, 1970  E. L. TRUELOVE, SR  3,534,892
UTILITY RACK FOR STATION WAGONS OR THE LIKE
Filed May 1, 1968  3 Sheets-Sheet 1
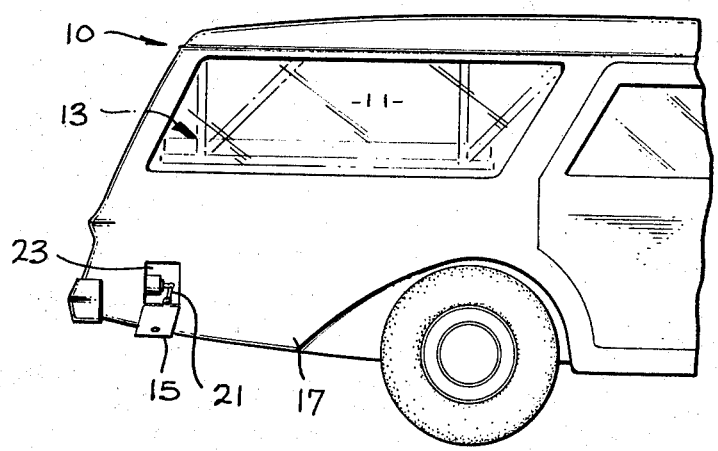
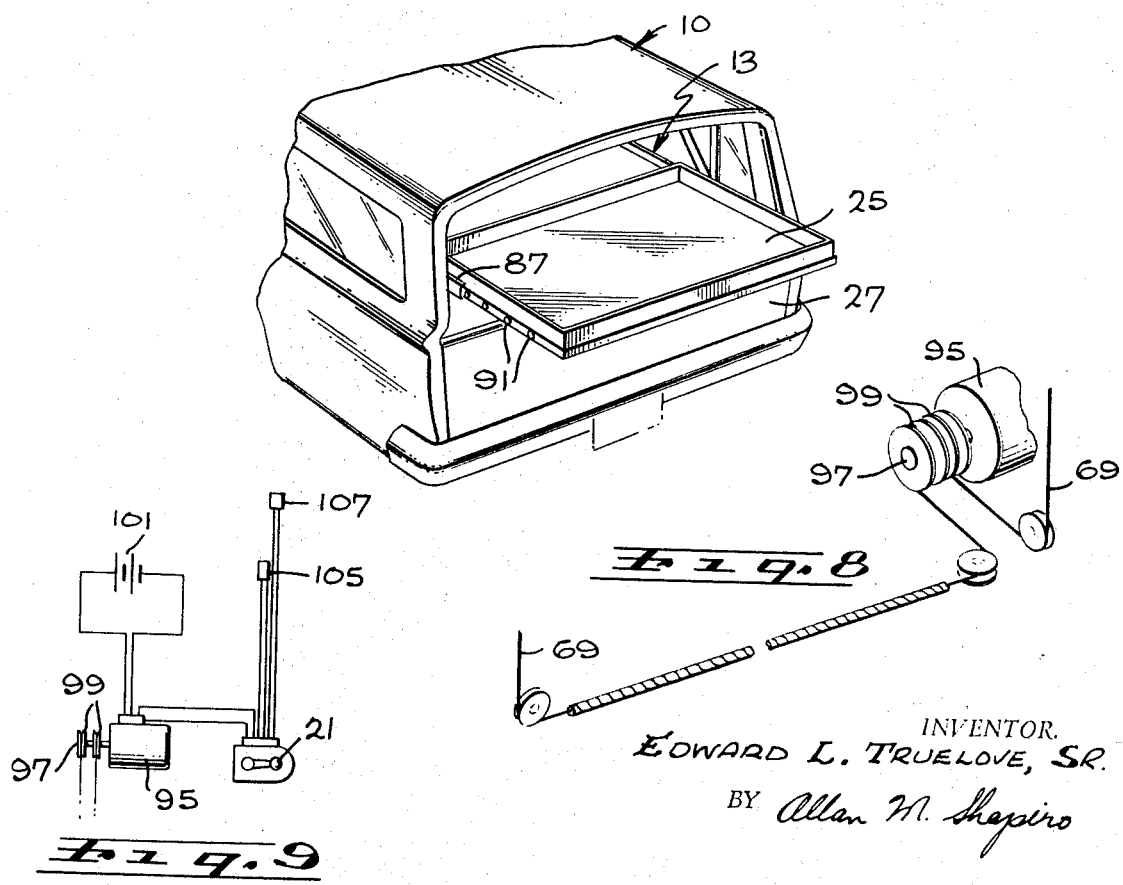
INVENTOR.
EDWARD L. TRUELOVE, SR.
BY Allan M. Shapiro
ATTORNEY Oct. 20, 1970  E. L. TRUELOVE, SR  3,534,892
UTILITY RACK FOR STATION WAGONS OR THE LIKE
Filed May 1, 1968  3 Sheets-Sheet 2
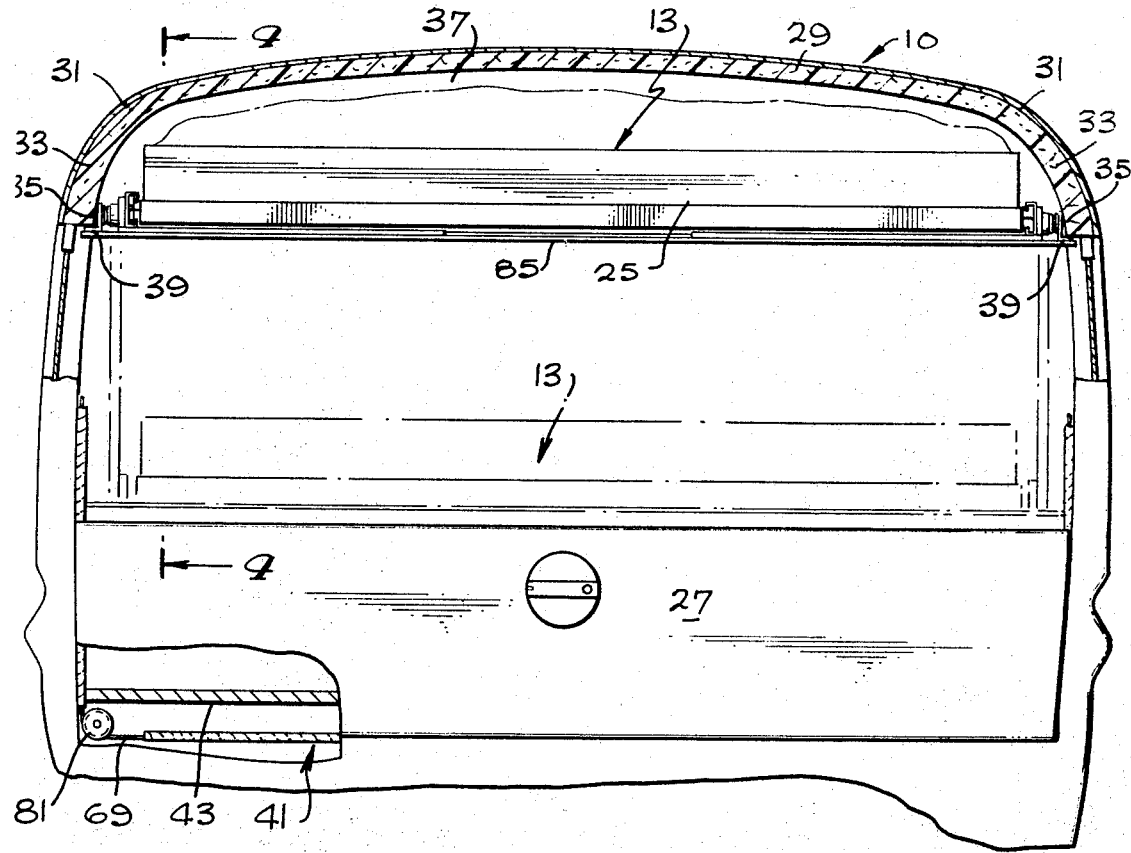
Fig. 3
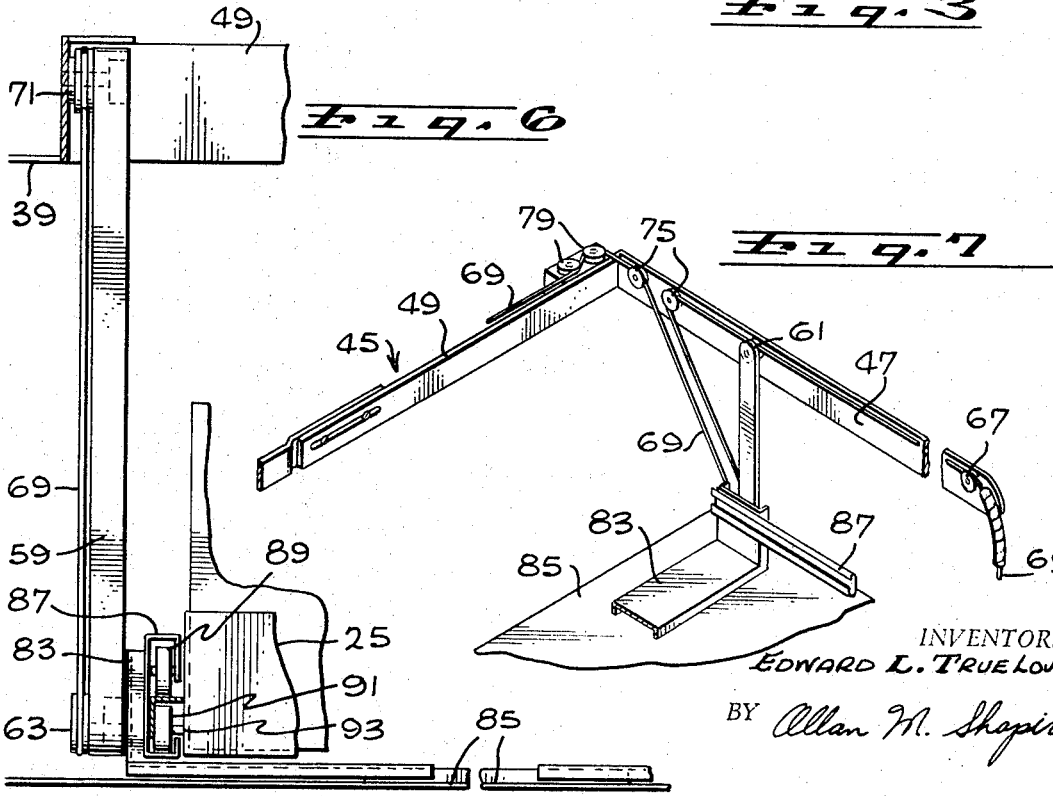
Fig. 6
Fig. 7
INVENTOR.
EDWARD L. TRUELOVE, SR.
BY Allan M. Shapiro
ATTORNEY Oct. 20, 1970    E. L. TRUELOVE, SR    3,534,892
UTILITY RACK FOR STATION WAGONS OR THE LIKE
Filed May 1, 1968    3 Sheets-Sheet 3
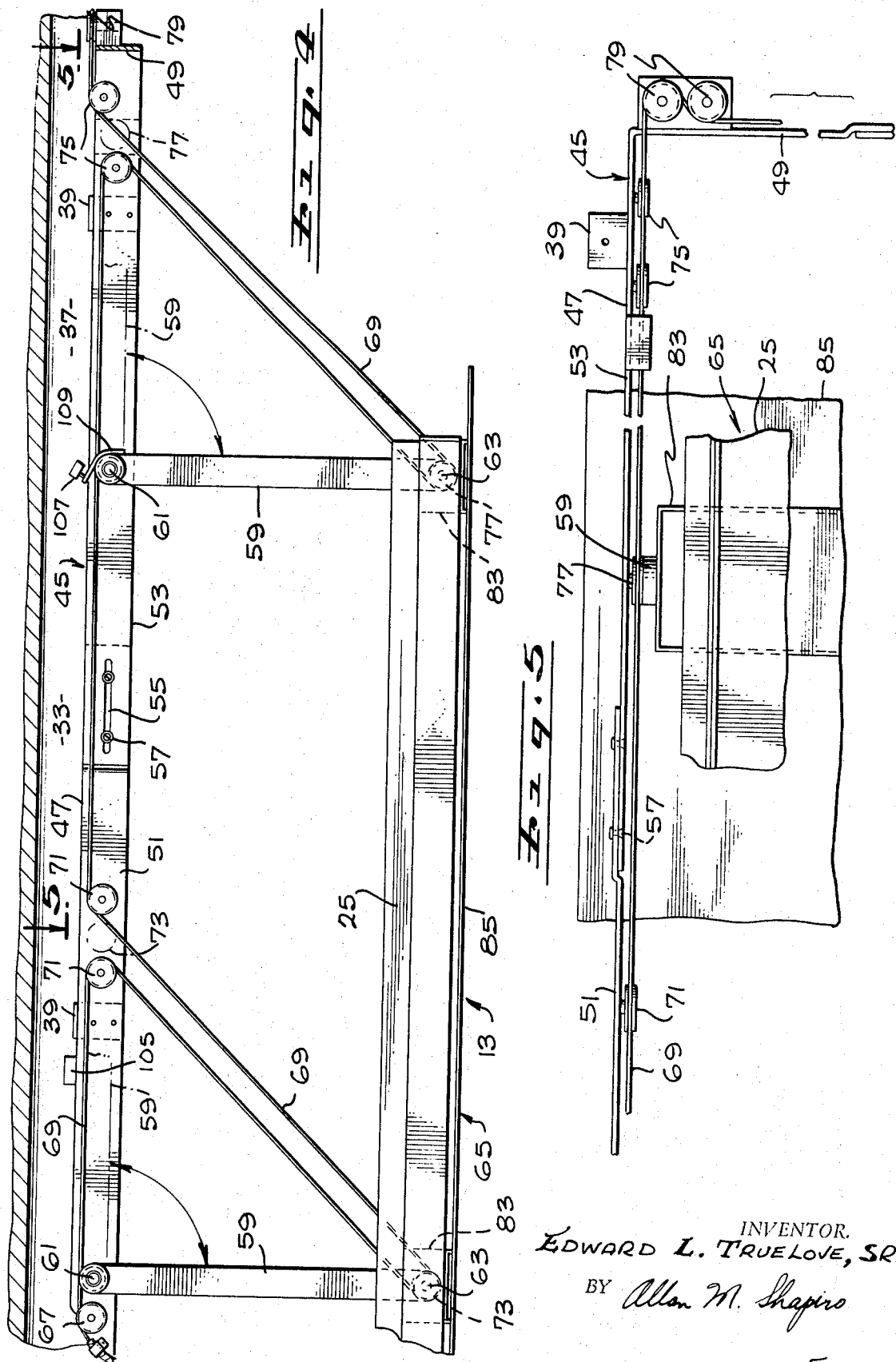
INVENTOR.
EDWARD L. TRUELOVE, SR.
BY Allan M. Shapiro
ATTORNEY United States Patent Office 3,534,892
Patented Oct. 20, 1970

3,534,892
UTILITY RACK FOR STATION WAGONS
OR THE LIKE
Edward L. Truelove, Sr., Los Angeles, Calif.
(14836 Calahan St., Van Nuys, Calif. 91402)
Filed May 1, 1968, Ser. No. 725,663
Int. Cl. B60r 9/04
U.S. Cl. 224—42.1
8 Claims

ABSTRACT OF THE DISCLOSURE

A utility rack for a station wagon for holding articles in a safe out-of-the-way upper position adjacent the inner side of the roof of the station wagon. The utility rack includes a tray-supporting platform supported by a plurality of arms which are pivotable for lowering the platform from its stowed position adjacent the inner side of the roof to a loading or unloading position, providing access to the platform and/or tray either from the rear of the station wagon or from the inside thereof. Automatic operation is provided by a motor driven cable and pulley arrangement which also provides security against non-authorized access.

BACKGROUND OF THE INVENTION

Field of the invention

This invention relates to storage racks and, more particularly, to means for utilizing the interior space of a station wagon above the garnish molding.

In the rear or storage region of each conventional station wagon, there is a portion of the interior that is located above the top of the windows where garnish molding is usually provided which is seldom utilized and is generally considered waste space. Such space in the passenger section, of course, is required for head room. However, in the rear loading and storage section of the station wagon, this space is rarely used. The largest container usually placed in this loading section is one that is capable of clearing the overhang of the rear loading doorway, and thus the top of the container does not extend above the garnish molding. It is also seldom that boxes are piled in the loading section to the extent of utilizing the aforementioned space, particularly because of the driving hazard it creates in inhibiting the driver's rear vision.

Therefore, this invention is directed to means for utilizing the interior space of a station wagon above the garnish molding without impeding the driver's rear vision.

Description of the prior art

Heretofore, utility racks have been advanced which utilize the space adjacent the inner side of the roof of a station wagon. However, these conventional devices have suffered from various limitations and disadvantages which have apparently precluded their widespread acceptance in practical use.

A previous utility rack, as exemplified in U.S. Pat. No. 3,049,273, includes brackets that are affixed to the garnish molding, a rack unit separably connected to the brackets in a transverse horizontal position to substantially enclose the interior space above the garnish molding and retractable means to support either end of the rack, selectively, in a lowered loading or unloading position. A disadvantage of this device is that the loading or unloading position of the rack is never in a horizontal position to permit ease of hadnling of the stored articles, but rather, the rack is in a substantially 45° angle with the horizontal. This position severely limits the use of such a rack to carry single items, such as a piece of luggage that must be held while the rack is being raised or lowered. If more than a single item is placed on the rack unit, the items must be properly secured or they will tend to slide on the rack while loading and even fall out of the unit. Such a loading and unloading procedure is cumbersome, inconvenient and is especially impractical for storing items such as an open box of loose material, multiple small cartons, loose clothing, hunting and fishing gear and many other items that require a level loading platform and a level retraction operation.

SUMMARY OF THE INVENTION

The present invention provides a utility rack for a station wagon having an interior space located above the garnish molding and comprises a platform pivotally supported at its sides by a plurality of arms in a modified parallelogram relationship, with retracting means for pivoting the arms to raise and lower the platform from a loading or unloading lower position to a stowed upper position, substantially enclosing the above mentioned interior space, thereby fulfilling a primary object of the invention, i.e., providing a utility rack that utilizes the interior space of a station wagon above the garnish molding.

Another object of the invention is to provide a utility rack of the character referred to above that is installed with easy facility in differently sized station wagons and is readily removable.

A further object of the invention is to provide a utility rack that permits ready and convenient access in its loading position and is safely supported in its stored position.

The features of the present invention which are believed to be novel are set forth with particularity in the appended claims. The present invention, both as to its organization and manner of operation, together with further objects and advantages thereof, may best be understood by reference to the following description, taken in connection with the acocmpanying drawings.

BRIEF DESCRIPTION OF THE DRAWINGS

FIG. 1 is a side elevational view of a station wagon with a utility rack in accordance with the present invention located therein;

FIG. 2 is a perspective view of the utility rack in its lowered and extended position;

FIG. 3 is an enlarged rear elevational view, partly in section, of the utility rack located within the station wagon in its upper stowed position and in phantom, in its lowered position;

FIG. 4 is an enlarged side view, mostly in elevation, of the utility rack, taken generally along the line 4–4 of FIG. 3 in the lowered position, and fragmentarily illustrating the pivotal arms and pulleys in the raised position in phantom;

FIG. 5 is a fragmentary enlarged plan view of a portion of the utility rack taken substantially along line 5–5 of FIG. 4;

FIG. 6 is an enlarged fragmentary elevational view of the left side portion of the utility rack in the aspect shown in FIG. 3;

FIG. 7 is a fragmentary perspective view illustarting the mounting frame and pulley arrangement;

FIG. 8 is a fragmentary perspective view of the motor and initial cable and pulley drive system; and FIG. 9 is a diagrammatic illustration of the motor controller circuit.

DESCRIPTION OF THE PREFERRED EMBODIMENT

In the illustrated embodiment of the invention, FIG. 1 shows a conventional station wagon 10 having a rear loading compartment 11 with the inventive utility rack 13 shown in its lowered or loading position. An access door 15, located on the rear fender 17, is provided to permit access to the control switch 21, located within the motor compartment 23. As can be seen, the utility rack 13 is easily accessible from the rear of the station wagon or from the interior thereof.

As shown in FIG. 2, the utility rack 13 carries a tray 25 capable of extending out of the rack 13 and through the space vacated by the rear window of the station wagon 10. The tray 25 also extends over the rear door or tail gate 27 and thus the door 27 is not required to be opened in order to gain access to the tray 25 or any articles located thereon.

Referring to FIG. 3, the station wagon 10 typically comprises a roof 29, side walls 33, and a pair of coved corners 31 extending into a blending connection with the roof 29 and the side walls 33. Also conventionally, garnish moldings 35 are provided along the side walls 33. It will be realized from the foregoing that, regardless of whether the coved portions 31 are present or whether the roof 29 joins more sharply with the side walls 33, there is an interior space 37 located above a horizontal plane through the garnish molding 35 and beneath the roof 29.

This out-of-the-way space 37 is peculiarly adapted for storing articles either for transport from place to place or for longer periods of time.

The utility rack 13 is shown in solid lines in its stowed position, completely confined within the interior space 37, and is shown in broken lines in its extended or loading position. The utility rack 13 includes a set of at least four brackets 39 that are affixed to the garnish molding 35 as permanent but removable installations. The rack unit is separably connected to said brackets in a transverse horizontal position.

A portion of the cable system 41, described hereinafter, extends downward from both sides of the station wagon 10, and under the interior floor 43 leading to the control motor, as will be described hereinafter in connection with FIG. 8.

As shown in FIG. 4, the utility rack 13 further includes mounting means comprising a U-shaped frame, shown generally at 45, having a pair of legs 47 (one of which is shown) and a base 49 (shown in FIGS. 5 and 7). Since the left and right side elements are identical and arranged symmetrically, only the left side elements shown in FIG 4 will be described in connection therewith. Each of the legs 47 is attached to the brackets 39 and includes a pair of bars 51 and 53 connected together at their common ends. The bar 53 defines an elongated slot 55 located at its connecting end to receive a pair of screws 57 which extend into the connecting end of bar 51. For installation into differently sized station wagons and/or for differently sized trays 25, the desired total length of the two bars 51 and 53 is therefore adjustable with the screws 57 being tightened after the desired length has been determined. The base 49 is also of two pieces with their total length being adjustable in the same manner to extend to the sides of the station wagon.

A pair of arms 59 are pivotally connected at their upper ends 61 to the leg 47, while their lower ends 63 are pivotally connected to a platform 65. The tray 25 is positioned on the platform 65 to be carried thereby.

As shown by the arrows, each of the arms 59 is capable of being retracted from its verticle position (shown in solid lines) to a horizontal position (shown in broken lines).

The means for retracting the arms 59 is the cable drive system 41 which includes a plurality of pulleys mounted on the mounting frame 45. The first pulley 67, located adjacent the rear of the frame 45, is adapted to engage a cable 69 that is led up from the floor 43 (shown in FIG. 3). The next pair of pulleys 71 located on the frame 45 is positioned to be on both sides of a pulley 73, located on the lower end 63 of one arm 59, when the arm 59 is in its horizontal position. Likewise a second pair of pulleys 75 is located on the frame 45 and is positioned to be on both sides of a pulley 77 located on the lower end 63 of the other arm 59, again when the arm 59 is in a horizontal position. Another set of pulleys 79 is located on each end of the base 49 (shown more clearly in FIGS. 5 and 7).

As shown in FIGS. 3–5 and 7, a cable 69 extends from below the floor 43, around a pulley 81 located therein, up the side of the station wagon 10, over the pulley 67 and forward to the first of the pulleys 71. The cable 69 then loops downward around the pulley 73 and extends back to the second of the pulleys 71, continuing forwardly across to the second pair of pulleys 75 and repeating the downward loop formed around the pulley 77. The cable is then transferred to the other leg 47 of the frame 45 via the pulleys 79 on the base 49. A similar circuit is then repeated on the other leg 47 with the cable 69 finally leading down the other side of the station wagon 10 (as shown in FIG. 3).

As shown in FIGS. 4, 6 and 7, in particular, the platform 65 includes a pair of U-shaped members 83, each pair being pivotally attached at its ends to the corresponding pair of parallel arms 59. A rectangular sheet 85 is integrally connected to the base portion of each of the members 83. A C-shaped track 87 is integrally connected to both sides of the members 83, with a plurality of wheels 89 connected to the upper portion of each C-shaped track 87. The lower portion of each track 87 is adapted to receive a plurality of wheels 91 mounted on trunnions 93 extending out of the sides of the tray 25 (also shown in FIG. 2).

FIG. 8 shows the motor control system located below the floor 43 of the station wagon 10. The system includes a reversible electric motor 95 having a drive shaft 97 extending out the one side thereof. A pair of master pulleys 99 are fixedly mounted on the drive shaft 97, each pulley 99 fixedly receiving one end of the cable 69.

FIG. 9 diagrammatically illustrates a conventional electrical circuit of the system with the vehicle's battery 101 electrically connected to the motor 95, the control switch 21, a micro-switch 105, and a micro-switch 107, the control switch 21 being of a conventional three-position type, i.e., one "off" position and two "on" positions, the latter being for causing the D.C. current from the battery 101 to energize the motor 95 in either of its two directions of rotation for either winding cable 69 upon pulleys 99 or unwinding therefrom. FIG. 4 shows both micro-switches 105 and 107 being mounted on the frame 45. The micro-switch 105 is located so that it is forcibly contacted by arm 59 when the arm 59 arrives at its horizontal position, while the micro-switch 107 is located so that it is forcibly contacted by an extension member 109 mounted on the upper end 61 of the arm 59, when the arm 59 arrives at its vertical position. The micro-switches may be positioned on the frame 45 to contact any one of the arms 59.

In operation, when it is desired to retract the utility rack 13 from its lowered position (shown in FIG. 4), the operator turns on the control switch 21 located in the compartment 23. The control switch 21 then activates the motor 95 to rotate the drive shaft 97 and the master pulleys 99. During rotation of the master pulleys 99, both ends of the cable 69 are wound around the master pulleys 99. This action makes the length of the cable 69 in the system become shorter, thereby closing the loops formed around each of the pulleys 73 and 77 of the arms 59. This causes the pulleys 73 and 77 to travel upwardly to a position between the pairs of pulleys 71 and 75, respectively. As the cable 69 draws the pulleys 73 and 77 upward, each arm 59 is rotated about its upper end 61 until it reaches a horizontal position. Upon reaching this position, one of the arms 59 contacts the normally closed micro-switch 105 for opening thereof and breaking the circuit to the motor 95 to stop the pulley system. It may be noted that the control switch 21 preferably includes a conventional time delay holding relay circuit which includes both normally closed micro-switches 105 and 107 and is energized by switch 21 in either "on" position. With the arms 59 moving to a horizontal position, the platform 65 and tray 25 are pivotally carried to a stowed position within the interior space 37, as shown in FIG. 3.

In lowering the utility rack 13 to its loading position, the procedure is reversed. Upon turning on the control switch 21, the motor 95 is activated to rotate the drive shaft 97 and master pulleys 99 in the opposite rotational direction. This action unwinds the cable 69 on the master pulleys to lengthen the cable 69 in the system. The cable slack created in the system is then taken up in forming the loops around the pulleys 73 and 77, whereupon these pulleys are permitted to be lowered with the arms 59 again rotating downward until they reach a vertical position, such lowering being accomplished by the gravitational weight of merely the platform 65. Upon reaching this position, the member 109 contacts the micro-switch 107, deactivating the motor 95 to again stop the pulley system. Consequently the platform 65 and tray 25 are lowered to the loading or unloading position. In this position, if desired, the tray 25 may be extended out of the rack 13 (as shown in FIG. 2) or may be completely taken out of the station wagon 10 by rolling the tray 25 along the track 87.

It will be evident that various articles may be easily placed in the tray 25, with the retracting means conveniently moving the entire rack 13 in a safe out-of-the-way position which does not interfere with the driver's rear vision and is secure from theft.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A utility rack for a station wagon having an interior space located beneath the roof and above the granish moldings comprising:
   mounting means including a U-shaped frame having a base and two parallel leg portions, each of said leg portions being securable to the garnish moldings at respective sides of the station wagon;
   a pair of equal length arms located at each of said sides in longitudinal and lateral symmetry with respect to each other, each said arm having a first and second end with the first end being pivotally connected to said mounting means;
   a horizontal platform disposed between said pairs of arms, said platform being pivotally connected to the second end of each of said arms for depending therefrom; and
   selectively operable means for pivoting said arms about their first ends, whereby said arms can articulate between a substantially vertical position and a substantially horizontal position for moving said platform in a constant horizontal attitude between corresponding lowered and raised positions.

2. The invention in accordance with claim 1 wherein each of said legs and base of said U-shaped frame are selectively extendable and retractable for fitted installation securement to said moldings.

3. A utility rack for a station wagon having an interior space located beneath the roof and above the garnish moldings comprising:
   mounting means adapted to be secured to the garnish molding at the sides of the station wagon;
   a pair of equal length arms located at each of said sides in longitudinal and lateral symmetry with respect to each other, each said arm having a first and second end with the first end being pivotally connected to said mounting means;
   a horizontal platform disposed between said pairs of arms, said platform being pivotally connected to the second end of each of said arms for depending therefrom;
   selectively operable means for pivoting said arms about their first ends, whereby said arms can articulate between a substantially vertical position and a substantially horizontal position for moving said platform in a constant horizontal attitude between corresponding lowered and raised positions;
   a tray adapted to be positioned on said platform for such movement therewith;
   track means attached to said platform at the sides thereof; and
   trunnion means located on said tray for slidingly engaging said track means.

4. The invention in accordance with claim 3 wherein rollers are mounted on said trunnions to engage said track means.

5. A utility rack for a station wagon having an interior space located beneath the roof and above the garnish moldings comprising:
   mounting means adapted to be secured to the garnish moldings at the sides of the station wagon;
   a pair of equal length arms located at each of said sides in longitudinal and lateral symmetry with respect to each other, each said arm having a first and second end with the first end being pivotally connected to said mounting means;
   a horizontal platform disposed between said pairs of arms, said platform being pivotally connected to the second end of each of said arms for depending therefrom; and
   selectively operable means for pivoting said arms about their first ends, whereby said arms can articulate between a substantially vertical position and a substantially horizontal position for moving said platform in a constant horizontal attitude between corresponding lowered and raised positions, said selectively operable means including:
      a plurality of first pulleys mounted on said mounting means;
      a plurality of second pulleys each mounted on said platform at said pivotal connection to said platform of said second end of each of said arms; and
      cable means engaging both of said first and second pulleys for moving said second pulleys with respect to said first pulleys.

6. The invention in accordance with claim 5 wherein said plurality of first pulleys are mounted in pairs on said mounting means, and each of said second pulleys is located between the pulleys of said pulley pairs when said arms are pivoted to said horizontal position.

7. The invention in accordance with claim 6 wherein the selectively operable means further includes:
   a reversible motor having a drive shaft extending out of one side thereof;
   a master pulley means connected to said drive shaft; and
   said cable means having both ends connected to said master pulley means, said cable means extending over each of said first and second pulley means, whereby said cable ends are adapted to wind and unwind about said master pulley means upon rotation of said motor.

8. The invention in accordance with claim 7 wherein a pair of switch means are electrically connected to said motor to deactivate the motor when said arms reach their horizontal and vertical positions respectively.

References Cited

UNITED STATES PATENTS

| | | |
|---|---|---|
| 368,883 | 8/1887 | Forbes. |
| 1,120,703 | 12/1914 | Evans. |
| 1,893,624 | 1/1933 | Jay. |
| 1,946,374 | 2/1934 | Warder. |
| 2,818,317 | 12/1957 | Little. |
| 2,953,287 | 9/1960 | Werner _____ 224—42.44 |
| 3,049,273 | 8/1962 | Crane. |

GERALD M. FORLENZA, Primary Examiner

U.S. Cl. X.R.

224—42.46